US008681102B2

(12) United States Patent
Edenborough (10) Patent No.: US 8,681,102 B2
(45) Date of Patent: Mar. 25, 2014

(54) ERGONOMIC ELEVATED KEYBOARD (76) Inventor: Kevin Lee Edenborough, Charleston, SC (US)

(*) Notice: Subject to any disclaimer, the term of this patent is extended or adjusted under 35 U.S.C. 154(b) by 116 days.

(21) Appl. No.: 13/506,408

(22) Filed: Apr. 17, 2012

(65) Prior Publication Data

US 2013/0271374 A1    Oct. 17, 2013

(51) Int. Cl.
*G06F 3/02*    (2006.01)
*G06F 3/041*    (2006.01)
*B41J 5/00*    (2006.01)

(52) U.S. Cl.
USPC ............................ 345/168; 345/173; 400/489

(58) Field of Classification Search
USPC .......... 345/156–157, 168–169; 400/472–473, 400/477, 488–490, 492
See application file for complete search history.

(56) References Cited

U.S. PATENT DOCUMENTS

| 4,913,573 | A | 4/1990 | Retter |
| 5,122,786 | A | 6/1992 | Rader |
| 5,833,378 | A | 11/1998 | Gibson |
| 6,088,022 | A | 7/2000 | Rakoski |
| 7,324,019 | B2 | 1/2008 | Levenson |
| 7,345,599 | B2 | 3/2008 | Franks et al. |
| 2006/0291946 | A1 | 12/2006 | Odell et al. |

*Primary Examiner* — Lun-Yi Lao
*Assistant Examiner* — Jarurat Suteerawongsa (57) ABSTRACT

An ergonomic, elevated keyboard includes: (a) a typing keyboard including upper level keys; (b) at least one substantially vertical support leg, a top edge of the support leg being attached to a lower surface of the keyboard, the support leg either elevating a front side of the keyboard substantially above a level of an opposite, rear side of the keyboard, forming a negative keyboard slope, or holding the keyboard in a raised, substantially horizontal position, the support leg forming a lower level under the keyboard, with a central, lower level space open to the front of the keyboard; and (c) at least one thumb key on the support leg on the lower level, the thumb key being absent from among the upper level keyboard keys. This simplified abstract is not intended to limit, and should not be interpreted as limiting, the scope of the claims.

20 Claims, 9 Drawing Sheets

ERGONOMIC ELEVATED KEYBOARD

BACKGROUND OF THE INVENTION

1. Technical Field

The present invention relates to an ergonomic, horizontally or front elevated computer keyboard device with some of its keys on its support leg or legs, which minimizes stress on a user's hands, wrists, arms, and shoulders without adversely affecting work performance, and allows for a more compact keyboard.

2. Background Information

Despite interest in the last decade or so in proper ergonomic workplace positioning to relieve stress on the body, carpal tunnel, tendonitis, sore shoulders, eye problems, back problems, and myriad other workplace-related physical complaints persist. Various keyboarding positions and keyboard structures have been proposed for alleviating stress and reducing workplace-related ailments.

A typical computer keyboard with a flat layout of keys requires the user's thumbs to move in a direction perpendicular to the palm. Orienting the keys in a manner that allows thumb movement in a plane parallel to the palm, sometimes referred to as "radial abduction", as is accomplished by the present invention, results in a more natural and less stressful motion.

BRIEF SUMMARY OF THE INVENTION

The present invention is an elevated keyboard device for avoiding stress on a user's hands, wrists, and arms, which includes: (a) a typing keyboard comprising keys on an upper level of the keyboard device; (b) at least one substantially vertical support leg, a top edge of the support leg(s) being attached to a lower surface of the keyboard, the support leg elevating a front side of the keyboard substantially above a level of an opposite, rear side of the keyboard, forming a negative keyboard slope, the support leg forming a lower level of the keyboard device under the keyboard, with a central, lower level space open to the front of the keyboard beneath the keyboard; and (c) at least one thumb key on an inside surface of the support leg on the lower level, the thumb key being absent from among the upper level keyboard keys. Alternatively, the support leg(s) supports the keyboard in a substantially horizontal position, which is substantially parallel to the table top or other surface on which it is placed. The keyboard device of the present invention is preferably collapsible for use or storage.

Advantages of the elevated keyboard device of the present invention include the following: 1) A more natural and comfortable hand position, which produces less stress during typing; 2) The ability to supply additional functionality, such as a pointing device, without increasing the overall footprint of the keyboard; and 3) A more compact arrangement of keys reduces the movement necessary for typing and increases the comfort of the user. A few keyboardists think it better for their posture to work standing in front of a work table. The present invention also works for them.

BRIEF DESCRIPTION OF THE SEVERAL VIEWS OF THE DRAWINGS

A more complete understanding of the invention and its advantages will be apparent from the following detailed description taken in conjunction with the accompanying drawings, wherein examples of the invention are shown, and wherein.

DETAILED DESCRIPTION OF THE INVENTION

In the following description, like reference characters designate like or corresponding parts throughout the several views. Also, in the following description, it is to be understood that such terms as "front," "back," "within," and the like are words of convenience and are not to be construed as limiting terms. Referring in more detail to the drawings, a device embodying the principles and concepts of the present invention and generally designated by the reference numeral 10 will now be described.

Figure 1:
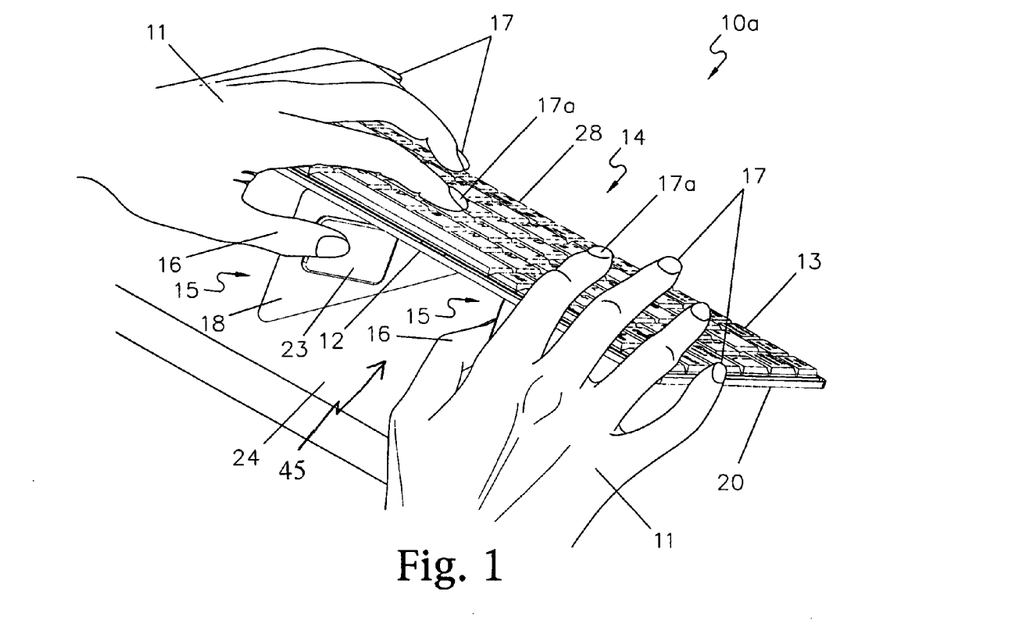
FIG. 1 is a front perspective view of a front-elevated keyboard device according to the present invention, shown in use.

Turning first to FIG. 1, a front-elevated ergonomic typing keyboard device 10a eases stress on a user's hands 11, wrists, arms, and shoulders over time by keeping the user's hands, wrists, and arms in a more natural position during use in comparison to a conventional flat keyboard. The front side 12 of the keyboard 14 of the front-elevated keyboard device 10*a* is elevated substantially above the surface of the table top 24, which is preferably a desk top, by two support legs 15 of the elevated keyboard device 10*a*. More preferably, the front side 12 of the keyboard 14 of the front-elevated keyboard device 10*a* is elevated between about one and about five inches, most preferably about three or four inches, above the rear side 13 of the keyboard 14, and above the surface on which the keyboard device 10 is placed. This height is sufficient to allow the user's thumbs 16 to be positioned in the space 45 beneath the front side 12 of the keyboard 14 for accessing the lower level of the keyboard device. The lower surface of the rear side 13 of the keyboard 14 rests on the table surface 24, so that the front-elevated keyboard 14 is back-slanted (slanted away from the user, with its front side 12 higher, as seen in FIG. 1). The front side 12 is the side of the keyboard 14 closest to the user, who is sitting, or sometimes standing, in front of the work table. The opposite, rear side 13 of the generally rectangular-shaped keyboard 14, which is normally closest to the computer screen, is lower than the front side 12.

Referring to FIGS. 1 through 4, this elevated keyboard device 10*a*, which is adapted for providing input to a computer device, includes: (a) a typing keyboard 14 including a number of keys 28 on an upper level on top of the keyboard device; and (b) at least one substantially vertical support leg 15, preferably two support legs 15, a top edge of each support leg 15 being attached to the lower surface 22 of the keyboard 14. The support leg (or legs) 15 forms a lower level of the keyboard device 10 under the keyboard 14, with a central lower level space 45 open to the front 12 of the keyboard 14 beneath the keyboard 14. The support leg 15 elevates the front side 12 of the keyboard 14 substantially above the level of the opposite, rear side 13 of the keyboard 14, forming a negative keyboard slope. The keyboard rear side 13 rests on the horizontal surface 24 of the table, desk, etc. The support leg or legs 15 may be hinged or affixed to the keyboard 14, or the keyboard 14 may simply rest on the support leg 15.

The keyboard support legs 15 preferably extend substantially vertically. The keyboard 14 preferably forms an angle of between about 30 and about 60 degrees with the table surface 24 (when viewed from one end 20 of the keyboard, where the rear keyboard side 13 is the vertex of the angle), as seen in FIGS. 1, 2, and 6-8. The support legs 15 hold the keyboard 14 at this angle. Two levels are thus formed: an upper level on top of the keyboard 14, and a lower level below the keyboard 14. The elevated keyboard 14 ordinarily inputs to a computer device (not shown) in a conventional manner. The keyboard 14 includes a number of keys 28 on its upper surface 21, including a key for each individual letter of the alphabet.

When a person's hands are held in a comfortable resting position, the thumbs 16 naturally rest slightly below the other four fingers 17, and below the person's forefinger 17*a* on each hand. Continuing with FIG. 1, when using the elevated keyboard device 10*a*, the user's thumbs 16 each naturally rest against the inside surface 18 of one of the keyboard support legs 15, which are set in from the ends 20 of the keyboard 14 and angled out from the user's viewpoint. Taking advantage of this comfortable position, and forming a more compact, bi-level, ergonomic keyboard, the elevated keyboard device 10*a* includes a thumb key 23 on the inside surface 18 of the support leg 15. There is preferably one thumb key 23 on the inside surface of each support leg 15. The thumb key 23 can have any function desired, but is preferably a space key positioned for actuation by the user's thumb 16. Thus, instead of pressing down on a conventional space bar with one thumb on top of a conventional flat keyboard, the user of the elevated keyboard device 10*a* presses one thumb 16 inward (in the direction of the palm of the hand) against the thumb key 23, which is on the inside surface 18 of the support leg 15, in order to create a space in the document being typed. This position is believed to reduce wear and tear on the tendons and nerves of the thumbs, hands, and arms.

Since it is by itself on the support leg(s) 15, the thumb key 23 can be, and preferably is larger than a keypad key 28 (most preferably about three times larger than a conventional keypad key) in order to provide sufficient surface area for easily striking it with the thumb 16 without having to look under the keyboard 14 at it. The upper level keys 28 of the keyboard 14 can be mapped in any order or manner. The main keyboard layout can be a typical QWERTY keyboard layout.

Figure 2:
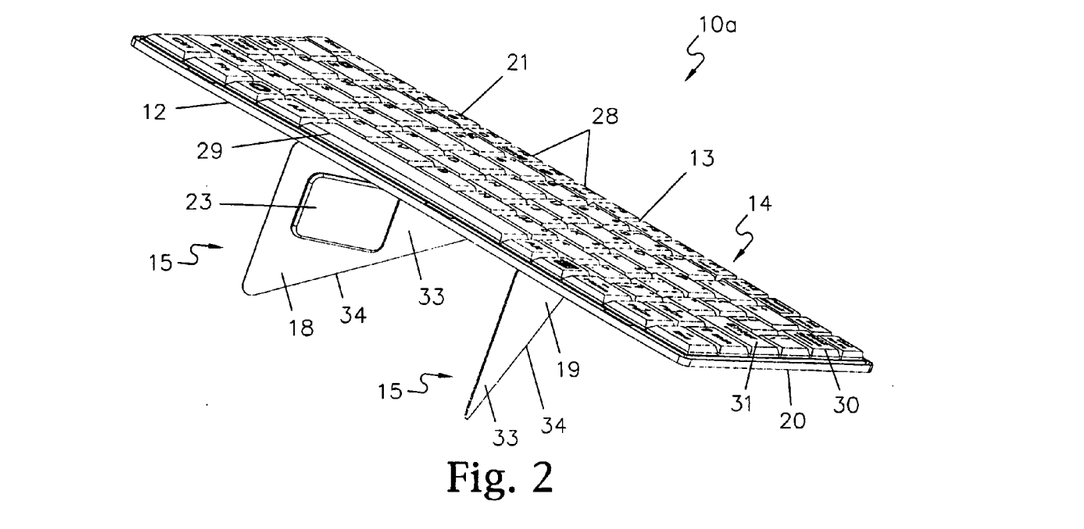
FIG. 2 is a front perspective view of a front-elevated keyboard device according to the present invention.
Figure 3:
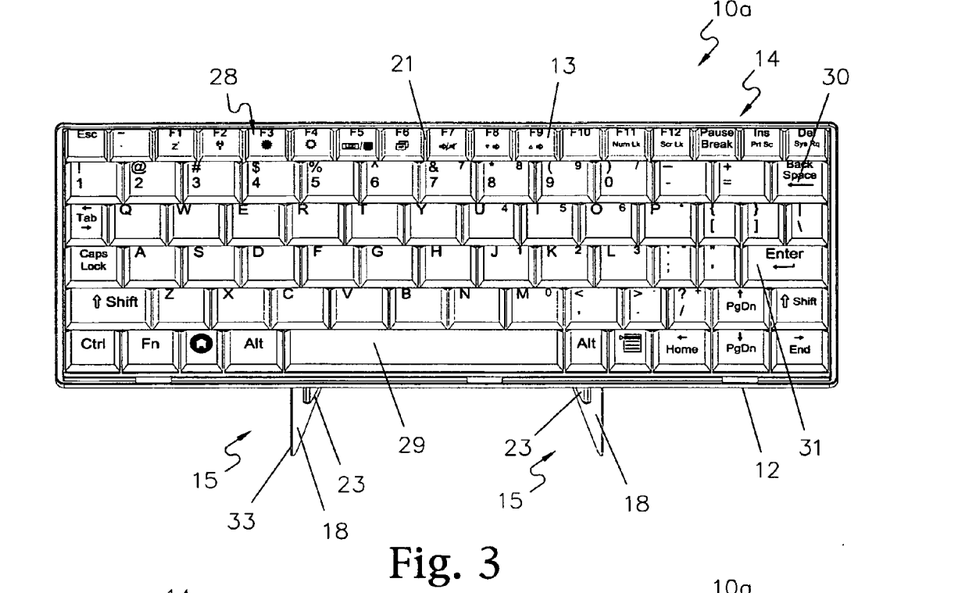
FIG. 3 is a top plan view of a keyboard of a front-elevated keyboard device according to FIG. 2.

Continuing with FIGS. 1 through 3, the thumb key 23 is a space key, an enter key, a backspace key, or an added key with any desired function. The keys 28 on the keyboard 14 itself can be in a conventional arrangement, with the thumb key 23 functioning as an extra, or alternative, space key, enter key, or backspace key. Preferably, though, the thumb keys 23 (or thumb key) replace the space key 29, enter key 31, and/or backspace key 30 on the keyboard 14, in which case one or two of the three keys 29-31 are deleted. The thumb keys 23 either have the same function as one another, e.g., they are both space keys, or they each serve a different function, e.g., one serves as a space key and the other serves as a backspace key. If two keyboard keys 29-31 are deleted, e.g., the space key and the backspace key, the keyboard 14 is then rearranged and its size reduced. As with a conventional keyboard, when the user depresses the space key, a space is inserted in the document being typed at the location of the cursor. Similarly, when the user depresses the backspace key, the last letter or space to the left of the cursor in the document being typed is deleted, as is conventional.

Figure 9:
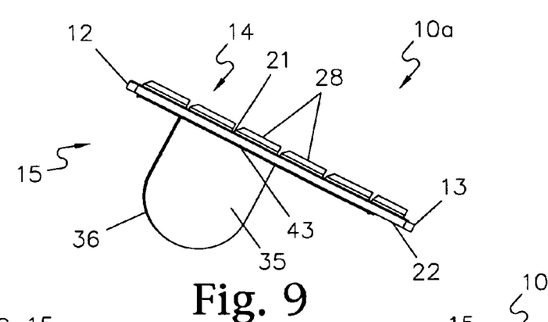
FIG. 9 is a side elevational view of a front-elevated keyboard device according to the present invention, shown with an arch-shaped support leg.

The support leg or legs 15 can be of any desired, suitable shape, size, and position. The keyboard 14 is supported at an angle by at least one support leg structure 32, preferably by two same-sized support legs 15. The support legs 15 are preferably attached to the keyboard 14. Preferred same-sized support leg shapes are substantially triangular 33 in shape as seen in FIGS. 1 and 2, with a base 34 of the triangular-shaped leg 33 in contact with the table top 24, or arch-shaped 35, as seen in FIG. 9, with a rounded bottom 36 of the arch-shaped leg 35 in contact with the table top 24. An upper end 43 of the arch-shaped support leg 35 is attached to a lower surface 22 of the keyboard 14. Since the arch-shaped support leg 35 is set approximately perpendicular to the downwardly slanted keyboard 14, as seen in FIG. 9, and the rear side 13 of the keyboard 14 rests on the table top 24, the elevated keyboard device 10*a* is stable on the table top.

Figure 4:
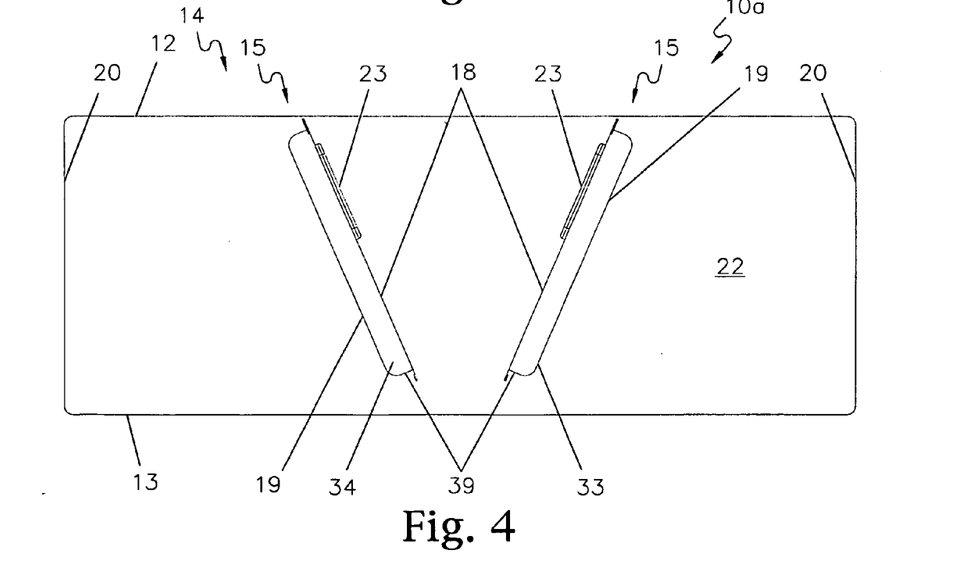
FIG. 4 is a bottom plan view of a front-elevated keyboard device according to the present invention.

As seen in FIGS. 1, 2 and 4, each support leg 15 is angled out at about a 45 degree angle from a transverse centerline of the keyboard 14. The support legs 15 are angled out away from one another, forming an approximate V-shape across the lower surface 22 of the keyboard 14 (this "V" shape not having a vertex), as seen in FIG. 4. The length of a support leg 15 is preferably almost equal to the width of the keyboard 14, as seen in FIG. 4, in order to support the keyboard 14 while the user is typing. The thumb keys 23 on the inside surface 18 of the support leg 15 may have any desired shape, and are preferably rectangular-shaped (which term includes square-shaped). In the same way a conventional keyboard key works, pressing the thumb key 23 closes a contact under it, sending a signal to the associated computer. The thumb key 23 is positioned near the front side 12 of the keyboard 14 and the front of the support leg 15 so the thumb key 23 is easy to reach with the thumb 16.

Figure 5:
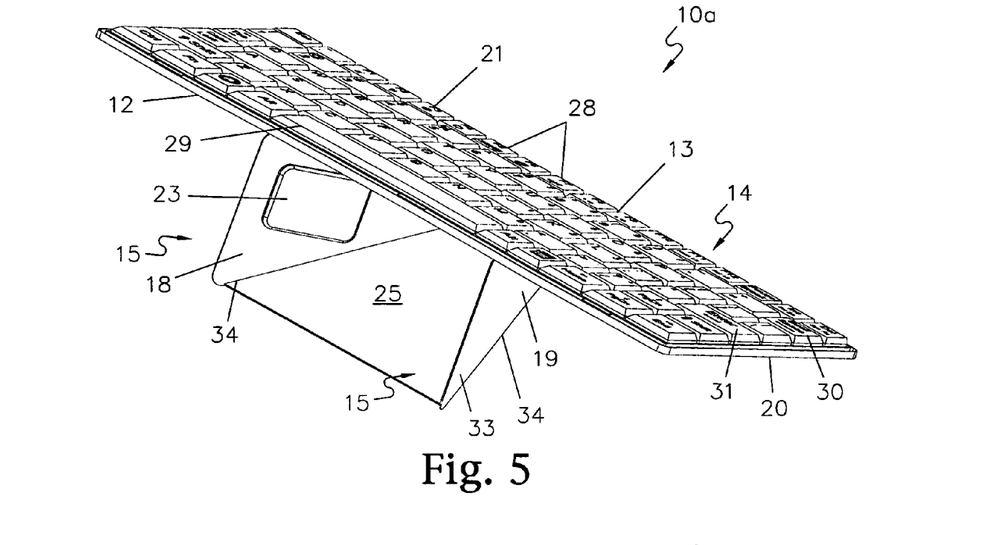
FIG. 5 is a front perspective view of a front-elevated keyboard device according to the present invention, shown with a horizontal baseboard.
Figure 6:
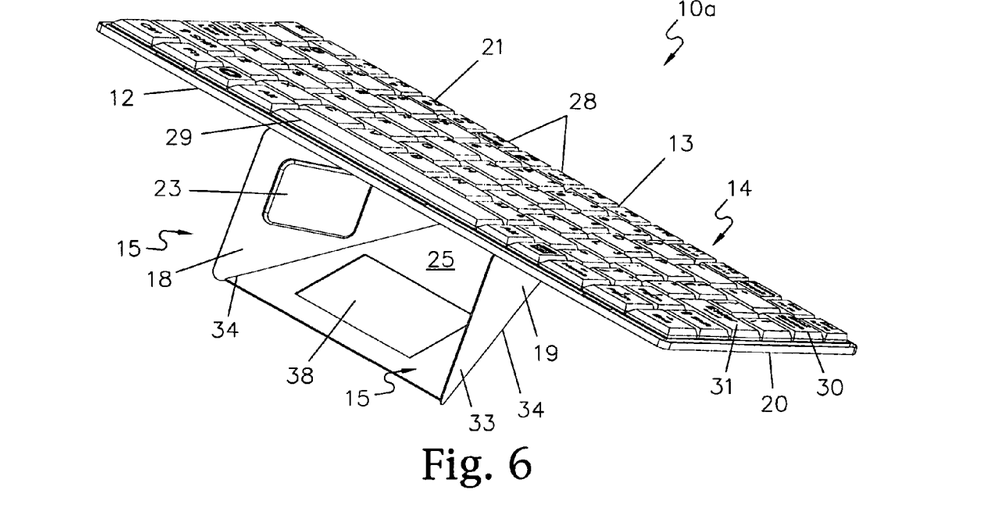
FIG. 6 is a front perspective view of the front-elevated keyboard device according to FIG. 5, shown with a touch pad on the horizontal baseboard.

The front-elevated keyboard device 10a shown in FIGS. 5 and 6 includes a horizontal baseboard 25 that extends between the support legs 33, most preferably between the bases 34 of the two vertical, substantially triangular-shaped support legs 15. The bottom surface of the horizontal baseboard 25 preferably rests on the table top 24. The baseboard 38 is believed to further support and anchor the elevated keyboard device 10a on the desk or other table top. Since it fits between and supports the angled support legs 15, the horizontal baseboard 25 is preferably generally trapezoidal in shape. This added horizontal surface also provides a substrate for a touchpad that is actuated by the user's thumbs 16. The horizontal baseboard 25 preferably supports a touchpad 38 on its upper surface, as illustrated in FIG. 6. The touchpad 38 functions like a laptop computer pointing device.

Figure 7:
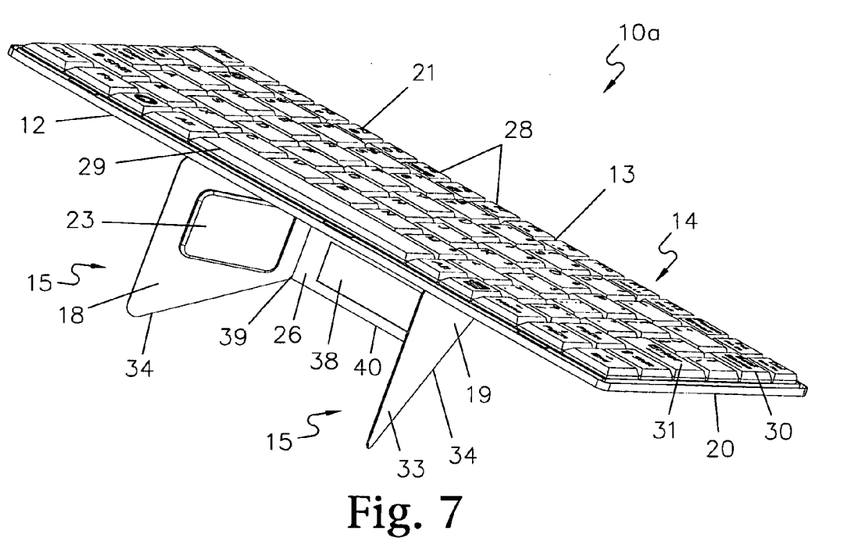
FIG. 7 is a front perspective view of a front-elevated keyboard device according to the present invention, shown with a touch pad on a vertical baseboard.
Figure 8:
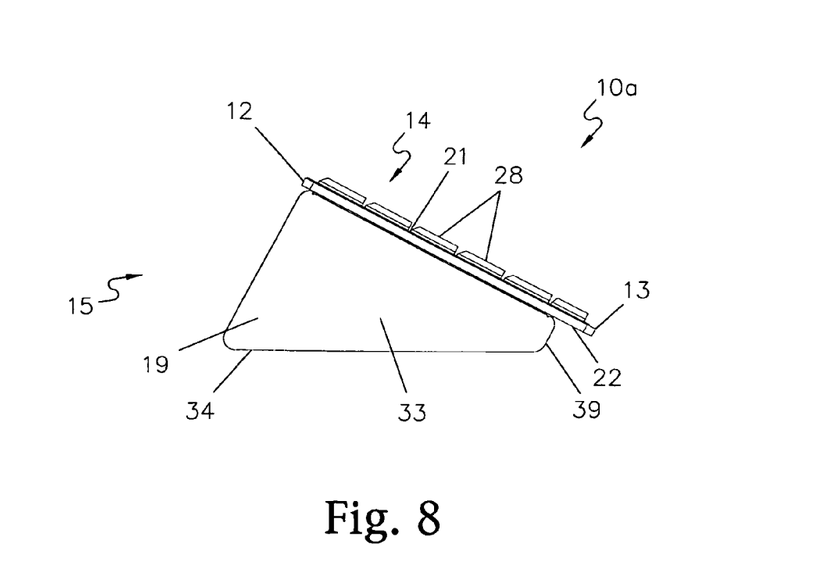
FIG. 8 is a side elevational view of a front-elevated keyboard device according to the present invention, shown with a generally triangular-shaped support leg.

The front-elevated keyboard device 10a shown in FIG. 7 includes a vertical baseboard 26 that extends between the rear end portions 39 of the two generally triangular-shaped support legs 33. As depicted in FIG. 8, the corners of the substantially triangular-shaped support legs 33 are rounded for safety reasons. The bottom edge 40 of the vertical baseboard 26, and the bases 34 of the triangular support legs 33, rest on the table top 24. By strapping the support legs 33 together at the rear, the vertical baseboard 26 is believed to help support and stabilize the elevated keyboard device 10a. The vertical baseboard 26, which is preferably generally rectangular in shape, is an additional surface for locating an additional, lower level key within reach of the user's thumb. The third, lower level key is adapted for actuation by the user's thumb moving in a forward direction. The vertical baseboard 26 preferably supports a touchpad 38 on its front surface, as illustrated in FIG. 7. The touchpad 38 is parallel to the front side 12 of the keyboard 14 behind the thumb keys 23 on the substantially vertical support legs 15.

Whether it is on the horizontal baseboard 25 or the vertical baseboard 26, the touchpad 38 can function as a space key, an enter key, a backspace key, or it can have any other desired function, such as a pointing device. The keys 28 on the keyboard 14 itself can be in a conventional arrangement, with the touchpad 38 functioning as an extra, or alternative space key, enter key, backspace key, or pointing device. The touchpad 38 optionally replaces the space key 29, enter key 31, or the backspace key 30 on the keyboard 14, in which case one of the three keys 29-31 on the keyboard 14 is deleted. The touchpad 38 replaces a different keyboard key 28 or keys than the thumb key 23. Where the elevated keyboard device 10a has two thumb keys 23 and a touchpad 38, two or three keyboard keys 29-31 can be deleted, depending on whether the thumb keys 23 perform the same function as, or a different function than, one another. Importantly, when three keyboard keys 29-31 are deleted, the keyboard 14 can be rearranged into a more compact form. Use of the touchpad 38 as a pointing device is very efficient, since the user uses a thumb on it. The user need not lift the index finger away from the keys on the upper level to use a conventional pointing device.

A novel, split level (upper level on top of and lower level below the keyboard), back-slanted keyboard 14 is created, with the user's thumbs 16 operating in the space 45 on the lower level on the thumb keys 23 and the touchpad 38, and the user's other four fingers 17 operating on the upper level keypad, as seen in FIG. 1. Since they rest on the keyboard 14, the metacarpal bones of the four fingers 17 also slant down at an angle. Since the hand and arm are not under as much strain to hold up the metacarpals during the typing process, the position is more ergonomic, and therefore healthier. The typist's four fingers 17 naturally curve slightly at the joints during the typing process, and the elbow is bent at an appropriate angle.

The touchpad 38 may have any desired shape. It is preferably rectangular-shaped (which term includes square-shaped), as seen in FIG. 7. The touchpad 38 may function as a key to perform functions similar to the keys found on a typical computer keyboard, or it can be a touch sensitive surface that allows the user to control the pointer on the screen similar to the touchpad found on many laptop computers.

The support legs 15 are optionally collapsible (see FIG. 11) for easier storage of the keyboard device 10, or for use of the keyboard 14 prone on the desk top. When the keyboard device 10 is in the collapsed position, the keyboard 14 lies relatively flat on the desk top or other surface, so the touch pads 23 and inverted key 41 are not accessible and cannot be used.

Figure 10:
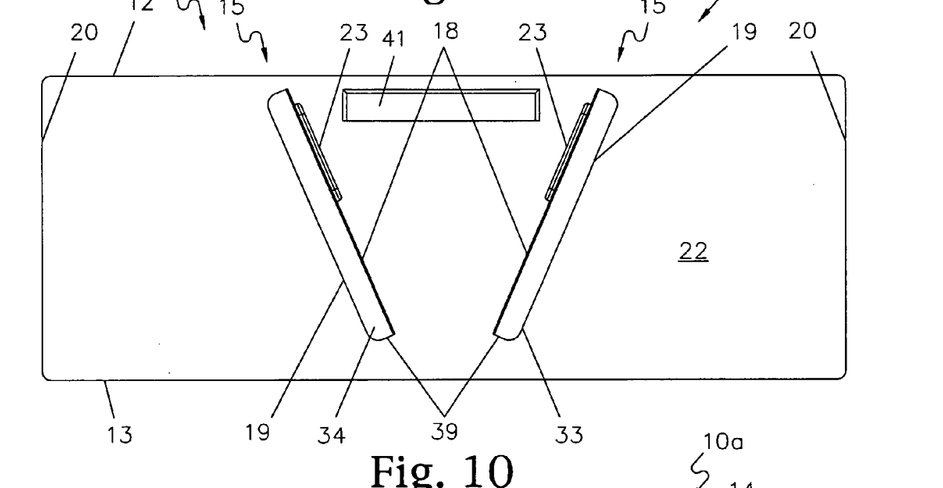
FIG. 10 is a bottom plan view of an elevated keyboard device according to the present invention, shown with an inverted key.
Figure 11:
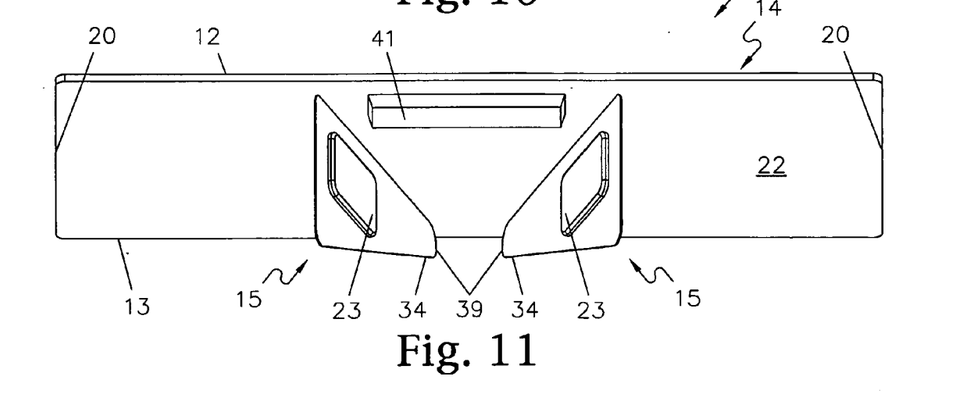
FIG. 11 is a perspective view of a lower level of a front-elevated keyboard device according to the present invention.

As seen in FIGS. 10 and 11, an additional, "inverted key" 41 is mounted upside down on the lower surface 22 of the keyboard 14 between the front ends of the support legs 15. The support legs 15 are angled out away from one another on the lower surface 22 of the keyboard 14. The inverted key 41 is actuated by an upward motion of the user's thumb 16. The thumb keys 23 are nearby so that the user need only make a slight sideways motion with one thumb 16 to actuate one of them. Like the thumb keys 23, the inverted key 41 can be mapped for any function desired, such as a space key. Although it can have any desired, suitable shape, the inverted key 41 is preferably rectangular in shape (most preferably bar-shaped), as seen in FIGS. 10 and 11, for easy access, since it is not normally visible to the user (unless the user stops typing and peers under the keyboard).

Where the elevated keyboard device 10a has two thumb keys 23 and an inverted key 41, two or three keys 29-31 on the keyboard can be deleted, depending on whether the thumb keys 23 perform the same function as, or a different function than, one another. Additional keys for operation by the user's thumb 16 can be placed on the support legs 15, the baseboards 25, 26, or the lower surface 22 of the keyboard 14, as desired. Importantly, when three keyboard keys 29-31 are deleted from the keyboard itself, the keyboard 14a,b can be rearranged into a more compact form. The more compact keyboard 14a,b is lighter in weight and takes up less valuable desk space.

Figure 12:
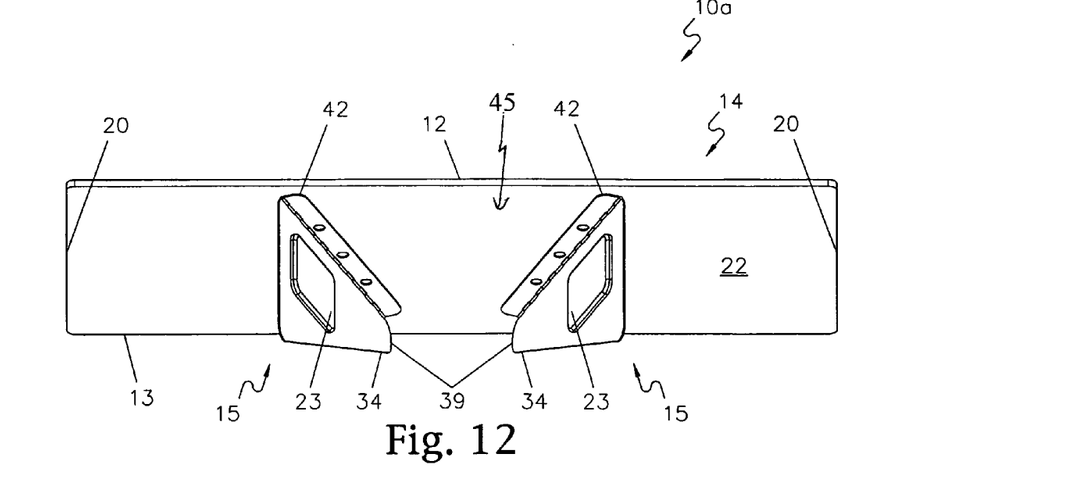
FIG. 12 is a perspective view of a lower level of a front-elevated keyboard device according to the present invention, showing hinged support legs in an erect position.

Turning to FIGS. 12 and 13, the front-elevated keyboard device 10a is preferably collapsible. The keyboard support legs 15 are substantially vertical when they are in an open, erect position as seen in FIG. 12. The erect support legs 15 hold the keyboard 14 at an angle of between about 30 and about 60 degrees, so the thumbs can be used underneath the keyboard 14. The front side 12 of the keyboard 14 is higher than its rear side 13, forming a negative slope. The support legs 15 are each attached to the lower surface 22 of the keyboard 14 by a leg hinge 42. The two longitudinal sections of the leg hinge 42 are approximately at a right angle when the support legs 15 are in the erect position, one section of the hinge being attached to the lower surface of the keyboard 14. Any type of hinge can be employed, including a spring-loaded hinge.

Figure 13:
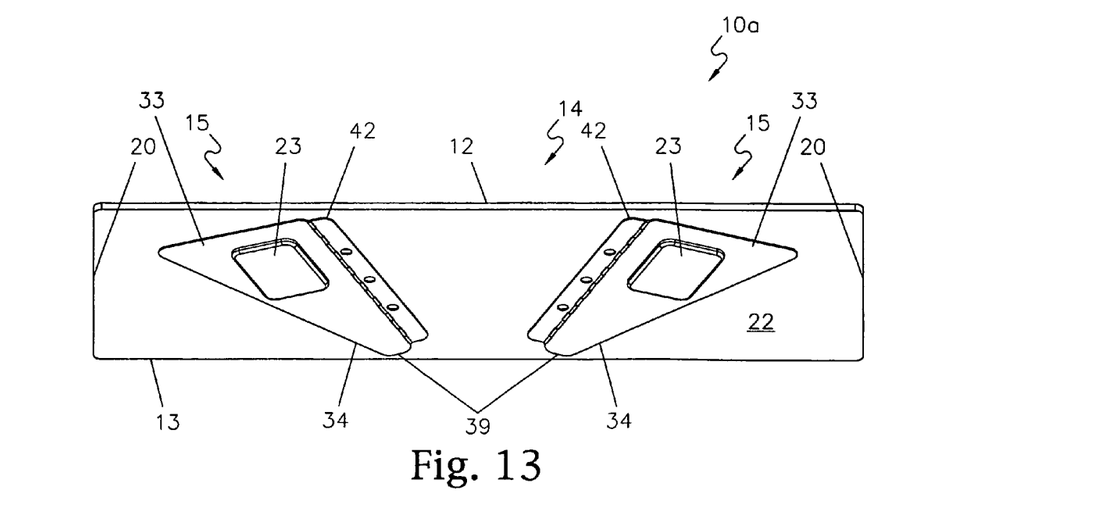
FIG. 13 is a perspective view of the lower level of the front-elevated keyboard device according to FIG. 12, showing the hinged support legs in a collapsed position.

In the collapsed position, the support legs 15 fold out and lie flat against the lower surface 22 of the keyboard 14 with the thumb keys 23 facing outward, as seen in FIG. 13. The collapsed position of the keyboard device 10 is useful for storage or shipping. Although a substantially triangular-shaped leg 33 is shown, the collapsible elevated keyboard device 10*a*, *b* can have any leg shape, such as an arch-shaped support leg 35 (see FIG. 9) or a rectangular-shaped support leg 37 (see FIG. 14).

Figures 14, 15:
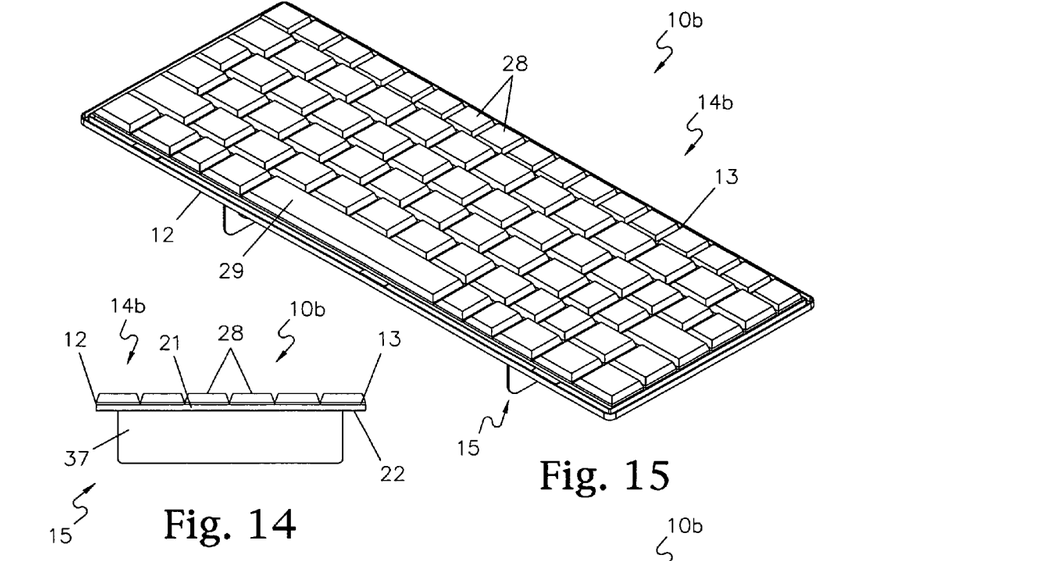
FIG. 14 is a side elevational view of a horizontally elevated keyboard device according to the present invention, showing a substantially rectangular-shaped support leg.
FIG. 15 is a front perspective view of a keyboard of a horizontally elevated keyboard device according to the present invention.
Figure 16:
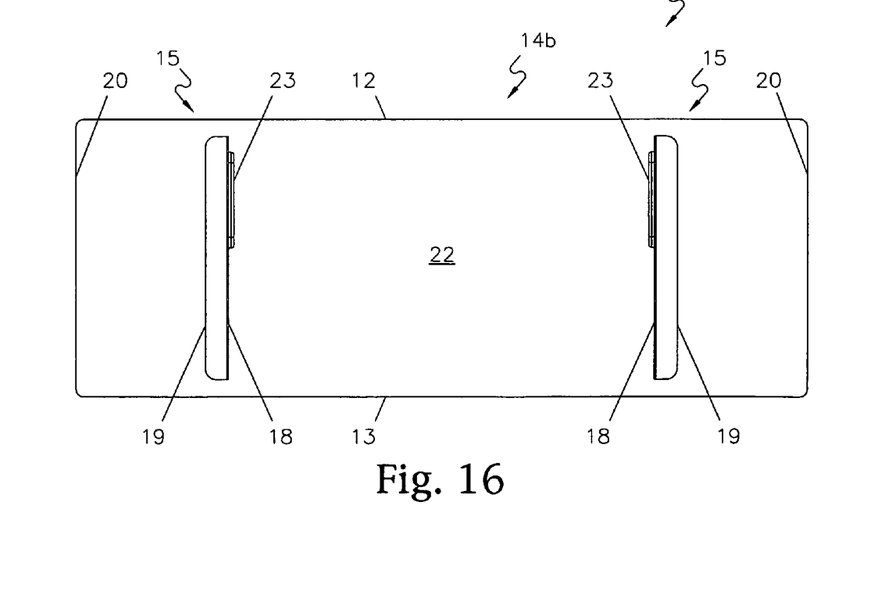
FIG. 16 is a bottom plan view of the horizontally elevated keyboard device according to FIG. 15.

Turning to FIGS. 14-16, the elevated keyboard 14*b* is substantially horizontal and elevated above the table top 24. The elevated keyboard 14*b* is substantially parallel to the table top 24 rather than being angled. The support legs 15 of the horizontal keyboard device 10*b* are preferably substantially rectangular-shaped 37, as seen in FIG. 14, with slightly rounded corners for safety. The support legs 37 are preferably hinged and collapsible (see hinges 42 in FIGS. 12 and 13), as described for the front-elevated keyboard device 10*a*. In use, the user's thumbs 16 operate in the space 45 on the lower level beneath the horizontally elevated keyboard device 10*b*, as described herein for the front elevated/back-slanted keyboard device 10*a*. When keys normally seated on top of the keyboard 14 are placed in this functional lower level, keys on the keyboard 14 can be removed and a smaller, more compact keyboard upper level can be created.

As shown in FIG. 16, the support legs 37 are substantially parallel to one another on the lower surface 22 of the keyboard 14. Each support leg 37 is slightly shorter than the width of the keyboard 14*b*. The support legs 37 are set in from the ends of the keyboard 14*b*. The thumb key 23 is positioned on the support leg 37 near the front side 12 of the keyboard 14 and the front of the support leg 15 so the thumb key 23 is easy to reach with the thumb 16.

Figure 17:
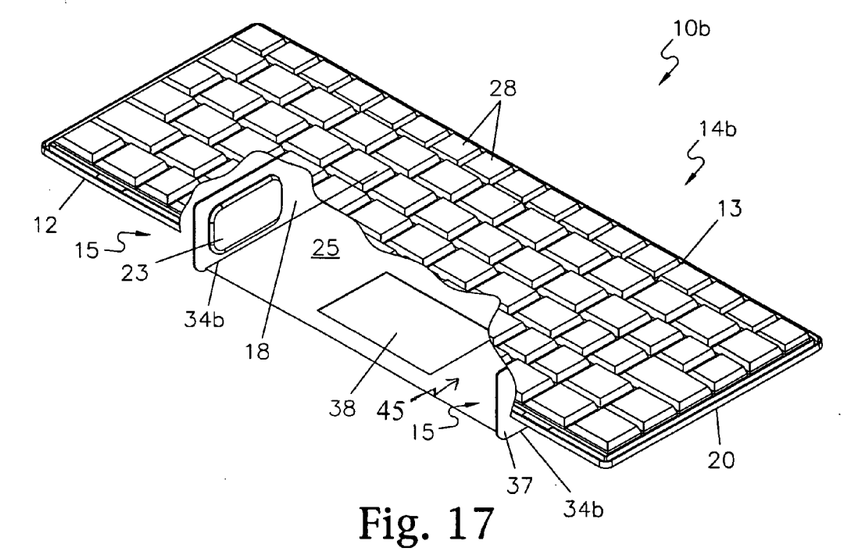
FIG. 17 is a front perspective view of a horizontally elevated keyboard device according to the present invention, shown with a cutout in the keyboard for purposes of illustration.
Figure 18:
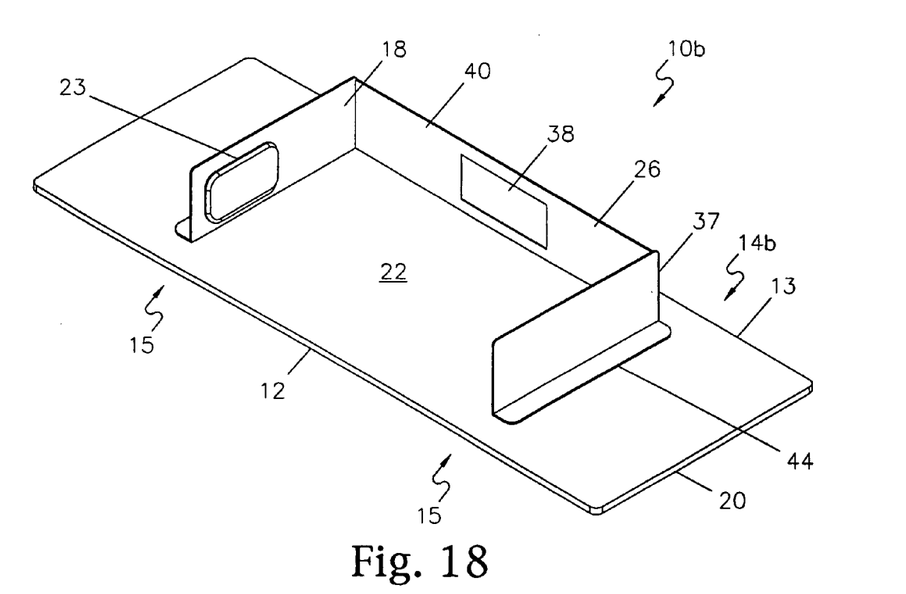
FIG. 18 is a perspective view of a lower level of a horizontally elevated keyboard device according to the present invention, shown with a vertical baseboard.

FIGS. 17 and 18 depict horizontally elevated keyboard devices 10*b*, each with a touch pad 38 on a horizontal or vertical baseboard 25, 26. As seen in FIG. 17, another elevated keyboard 14*b* includes substantially parallel and vertical keyboard support legs 15 and a touch pad on the horizontal baseboard 25. The horizontal baseboard 25 extends between the support legs 15, the opposite side edges of the horizontal baseboard 25 being attached to the bottom edges 34*b* of the two keyboard support legs 15. The support legs 15 are preferably same sized, rectangular-shaped 37, and mirror image, so the keyboard 14*b* is held above and substantially parallel to the table top. The horizontal baseboard 25 is preferably substantially parallel to the keyboard 14*b*. The rear of a thumb key 23 is attached on the inside surface 18 of each support leg 15. The rear of a touchpad 38 is attached to the inside surface of the horizontal baseboard 26 of the horizontal keyboard device 10*b*.

Continuing with FIG. 17, the thumb keys 23, which are preferably identical to one another in shape, are adapted for operation by the user's right and left thumbs. In use, the user's thumbs are relaxed under the front of the keyboard 14*b*, where the right thumb is within reach of the thumb key 23 on the right support leg 15, and the left thumb is within reach of the thumb key 23 on the left support leg 15. The user's thumbs can also be used to contact the nearby touchpad 38 on the horizontal baseboard 26.

As seen in FIG. 18, another horizontal keyboard device 10*b* includes substantially parallel and vertical keyboard support legs 15 extending between a vertical baseboard 26. There is preferably a flange 44 along the top edge of each support leg 15, which flares out to provide further leg support. The flange is attached to the lower surface 22 of the keyboard 14*b*, as shown in FIG. 18. The top edge of the vertical baseboard 26 is preferably attached to the lower surface 22 of the keyboard 14*b* close to the rear side 13 of the keyboard 14*b*. The support legs 15 are preferably same sized (generally rectangular-shaped 37) and mirror image, and the vertical baseboard 26 is of the same height as the two support legs, so the keyboard 14*b* is held above and substantially parallel to the table top. Since they are attached to one another at their ends, the support legs 15 and vertical baseboard 26 form one leg support unit. A thumb key 23 is attached on the inside surface 18 of each support leg 15. The back of a touchpad 38 is attached to the inside surface of the vertical baseboard 26.

Continuing with FIG. 18, the thumb keys 23 are positioned for actuation by the user's thumbs. In use, the user's thumbs are relaxed under the keyboard 14*b* (like they are in FIG. 1), where the right thumb is within reach of the relatively planar top surface of the thumb key 23 on the right support leg 15, and the user's left thumb is within reach of the relatively planar top surface of the thumb key 23 on the left support leg 15. One of the thumbs can also be stretched out to contact the touchpad 38 on the vertical baseboard 26. Additional keys for operation by the user's thumb 16 can be placed on the support legs 15, the baseboards 25, 26, or the lower surface 22 of the keyboard 14*b*, as desired.

Figure 19:
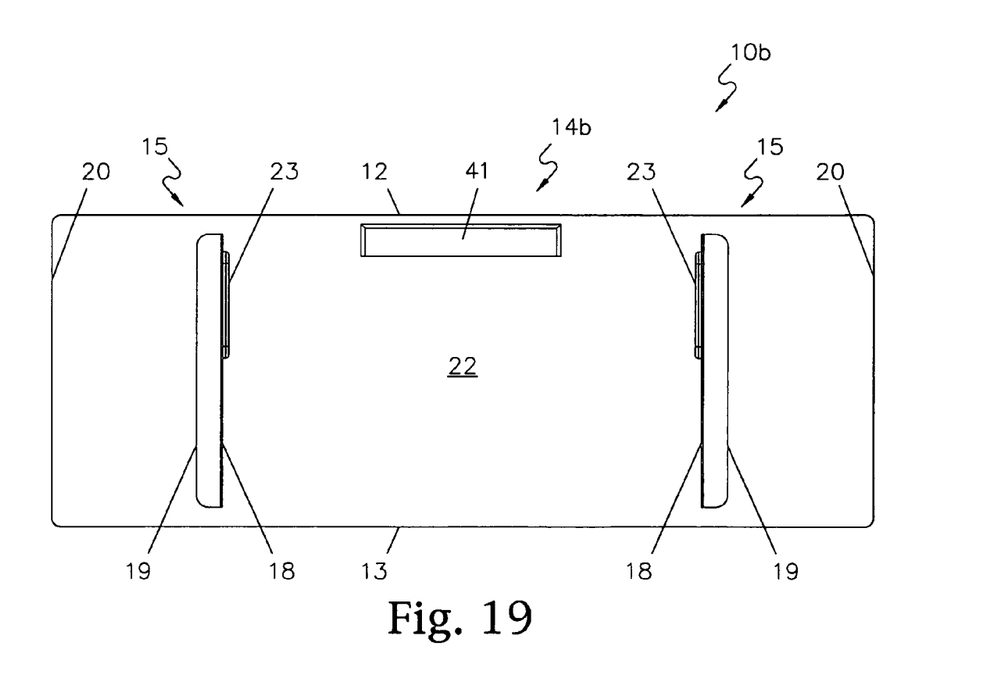
FIG. 19 is a bottom plan view of a horizontally elevated keyboard device according to the present invention, shown with an inverted key.

As shown in FIG. 19, an additional, "inverted key" 41 is mounted upside down on the lower surface 22 of the keyboard 14*b* between the front ends of the substantially parallel support legs 15. In use, the inverted key 41 is actuated by an upward motion of the user's thumb 16. The thumb keys 23 are nearby to the left and right, so that the user need only make a slight sideways motion with one thumb 16 to actuate one of them. Like the thumb keys 23, the inverted key 41 can be mapped for any function desired, such as a space key. Although it can have any desired, suitable shape, the inverted key 41 is preferably rectangular in shape (most preferably bar-shaped), as seen in FIG. 19, for easy access, since it is not normally visible to the user (unless the user stops typing and peers under the keyboard). Where the elevated keyboard device 10*a* has two thumb keys 23 and an inverted key 41, two or three keyboard keys 29-31 can be deleted, depending on whether the thumb keys 23 perform the same function as, or a different function than, one another.

In the horizontally elevated keyboard device 10*b* of FIG. 19, the support legs 37 are substantially parallel to one another on the lower surface 22 of the keyboard 14*b*. Each support leg 37 is slightly shorter than the width of the keyboard 14*b*. The support legs 37 are set in from the ends of the keyboard 14*b*. The thumb key 23 is positioned on the support leg 37 near the front side 12 of the keyboard 14*b* and the front of the support leg 15 so the thumb key 23 is easy to reach with the user's thumb 16.

It can be seen that the negative slope of the keyboard 14 herein serves a dual purpose: supporting the hands, wrists, arms, etc. in an ergonomic position during the typing process, and creating an additional functional lower level/space 45 under the keyboard 14. Some of the keys (e.g., space key, backspace key) normally seated on top of the keyboard 14 are placed on this functional lower level, where they are easy to use. With these keys moved to the lower level, a smaller, more compact keyboard upper level can be utilized. Thus, the support leg construction of the present elevated keyboard device 10 is not merely a frame. The lower level of the keyboard device 10 must be open at the front to permit access by the user's thumbs, and the keyboard support legs 15 must support the "lower" keys (thumb keys, touchpad, etc.) at a position and angle suitable for easy, comfortable use. The keyboard 14*a,b* must be sufficiently elevated above the surface of the table top on which the keyboard device 10*a,b* rests for the user's thumbs to be used underneath the keyboard 14. If the front of the lower level of the bi-level construction herein was not open, as seen in FIGS. 1, 2, 10-12, 17, and 18, the thumb keys 23, touchpad 38, etc. on the lower level would not be accessible or useable.

The keyboard 14 does not include a hinged keyboard support tray or a wrist rest that would impede use of the thumbs on the thumb keys and/or touchpad. Other than leg support hinges 42 on the collapsible elevated keyboard device 10 herein, the elevated keyboard device 10*a,b* preferably does not include a hinge. The keyboard 14*a,b* herein is ordinarily for providing input to any suitable type of computer device, including a desk top computer, a laptop, or a tablet-type computer. The computer screen associated with the keyboard 14*a,b* is positioned at any desired height.

A few keyboardists think it better for their posture/health to work standing in front of a work table instead of sitting at a desk or the like. The elevated keyboard of the present invention can easily work for them, simply by positioning it on the surface of the work table.

From the foregoing it can be realized that the described device of the present invention may be easily and conveniently utilized as an ergonomic, elevated keyboard. It is to be understood that any dimensions given herein are illustrative, and are not meant to be limiting.

While preferred embodiments of the invention have been described using specific terms, this description is for illustrative purposes only. It will be apparent to those of ordinary skill in the art that various modifications, substitutions, omissions, and changes may be made without departing from the spirit or scope of the invention, and that such are intended to be within the scope of the present invention as defined by the following claims. It is intended that the doctrine of equivalents be relied upon to determine the fair scope of these claims in connection with any other person's product which fall outside the literal wording of these claims, but which in reality do not materially depart from this invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

BRIEF LIST OF REFERENCE NUMBERS USED IN THE DRAWINGS

10*a* front-elevated keyboard
10*b* horizontally elevated keyboard
11 user's hands
12 keyboard front side
13 keyboard rear side
14 keyboard
15 keyboard support legs
16 thumbs
17 fingers
18 inside surface of support leg
19 outside surface of support leg
20 keyboard ends
21 upper surface of keyboard
22 lower surface of keyboard
23 thumb key
24 table top
25 horizontal baseboard
26 vertical baseboard
28 keyboard keys
29 space key
30 backspace key
31 enter key
32 single support leg structure
33 triangular-shaped support leg
34 base of triangular support leg
35 arch-shaped support leg
36 rounded bottom of arch support leg
37 rectangular-shaped support leg
38 touchpad
39 rear end of triangular support leg
40 bottom edge of vertical baseboard
41 inverted key
42 support leg hinge
43 upper end of arch-shaped support leg
44 support leg flange
45 space—lower level

What is claimed is:

1. An ergonomic elevated keyboard device, comprising:
   (a) a typing keyboard comprising a plurality of keys on an upper level of the keyboard device;
   (b) at least one substantially vertical support leg, a top edge of the at least one support leg being attached to a lower surface of the keyboard, the at least one support leg elevating a front side of the keyboard substantially above a level of an opposite, rear side of the keyboard, forming a negative keyboard slope, the at least one support leg forming a lower level of the keyboard device under the keyboard, with a central lower level space open to the front of the keyboard beneath the keyboard; and
   (c) at least one thumb key on an inside surface of the at least one support leg on the lower level, the at least one thumb key being absent from among the plurality of upper level keyboard keys.

2. The elevated keyboard device according to claim 1, comprising two of the at least one support legs, each of the support legs being set in from an opposite end of the keyboard, each of the support legs supporting one of the at least one thumb keys, for a total of two of the thumb keys.

3. The elevated keyboard device according to claim 2, wherein each of the two support legs is substantially triangular in shape, the two support legs being angled out away from one another and forming the lower level space, and one of the thumb keys is a space key.

4. The elevated keyboard device according to claim 3, further comprising a horizontal baseboard extending between the two support legs, and a touchpad on an upper surface of the horizontal baseboard.

5. The elevated keyboard device according to claim 3, wherein the keyboard device is collapsible, the top edge of each of the support legs being hinged to the lower surface of the keyboard, and the support legs have an erect, substantially vertical position, and a collapsed substantially horizontal position against the lower surface of the keyboard.

6. The elevated keyboard device according to claim 2, wherein one of the two thumb keys is an enter key and the other one of the two thumb keys is a backspace key, and the plurality of upper level keyboard keys does not comprise an enter key or a backspace key.

7. The elevated keyboard device according to claim 2, wherein one of the thumb keys is a space key, and none of the upper level keyboard keys is a space key; and
   wherein the front side of the keyboard is elevated between about one and about five inches above a level of the rear side of the keyboard.

8. The elevated keyboard device according to claim 7, wherein the inverted key is a space key, an enter key, or a backspace key that is not present among the plurality of upper level keyboard keys.

9. The elevated keyboard device according to claim 2, further comprising a vertical baseboard extending between opposite rear end portions of the two support legs, and a touchpad on a front surface of the vertical baseboard.

10. The elevated keyboard device according to claim 2, further comprising an inverted key extending down from on a lower surface of the keyboard between and adjacent front end portions of the two support legs.

11. The elevated keyboard device according to claim 10, wherein one of the thumb keys is a space key, and the inverted key is an enter key, or vice versa, and wherein the plurality of upper level keyboard keys does not comprise a space key or an enter key.

12. The elevated keyboard device according to claim 1, wherein the at least one support leg is substantially arch-shaped with a rounded bottom, an upper end of the arch-shaped support leg being attached to a lower surface of the keyboard.

13. An ergonomic elevated keyboard device, comprising: (a) a typing keyboard comprising a plurality of keys on an upper level of the keyboard device; (b) at least one substantially vertical support leg, a top edge of the at least one support leg contacting a lower surface of the keyboard, the at least one support leg forming a lower level of the keyboard device under the keyboard, with a central lower level space open to the front of the keyboard beneath the keyboard; and (c) at least one thumb key on the at least one substantially vertical support leg; wherein the at least one support leg elevates the keyboard to a raised, horizontal position.

14. The elevated keyboard device according to claim 13, wherein the keyboard device comprises two of the at least one support legs, each of the support legs being substantially rectangular-shaped and set in from an opposite end of the keyboard, each of the support legs supporting one of the at least one thumb keys, for a total of two of the thumb keys.

15. The elevated keyboard device according to claim 14, further comprising a horizontal baseboard extending between the two support legs, and a touchpad on an upper surface of the horizontal baseboard.

16. The elevated keyboard device according to claim 14, further comprising a vertical baseboard extending between opposite rear end portions of the two support legs, and a touchpad on a front surface of the vertical baseboard.

17. The elevated keyboard device according to claim 13, further comprising an inverted key attached on a lower surface of the keyboard between front end portions of and adjacent the two support legs.

18. The elevated keyboard device according to claim 13, wherein a top edge of each of the substantially vertical support legs is hinged to the lower surface of the keyboard, and the support legs have an open, substantially vertical position, and a closed, substantially horizontal position, the keyboard device being collapsible.

19. The elevated keyboard device according to claim 13, further comprising a touchpad on an inside surface of the at least one support leg.

20. The elevated keyboard device according to claim 19, wherein the touchpad is a pointing device, the at least one thumb key is a space key, and the plurality of upper level keyboard keys does not comprise a pointing device or a space key.

* * * * *